Figure 1:
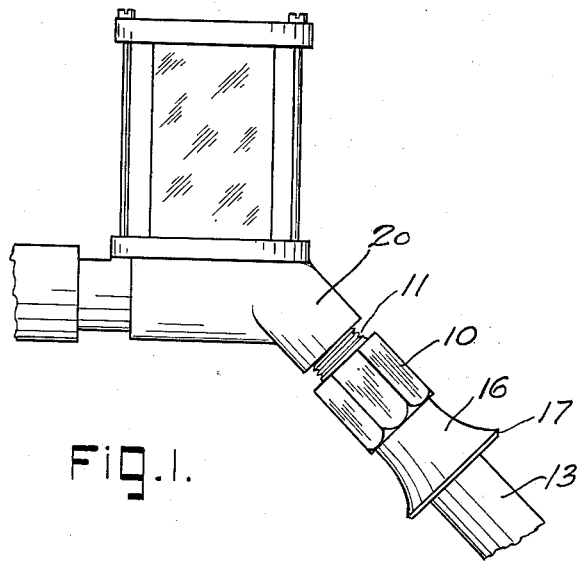

Sept. 15, 1942.   L. A. CARLSON   2,295,830
HOSE COUPLING
Filed Nov. 26, 1940

INVENTOR.
LESTER A. CARLSON
BY Albert Sperry.
ATTORNEY

Patented Sept. 15, 1942

2,295,830

UNITED STATES PATENT OFFICE 2,295,830

HOSE COUPLING

Lester A. Carlson, Pittsburgh, Pa., assignor to Scovill Manufacturing Company, Waterbury, Conn., a corporation of Connecticut Application November 26, 1940, Serial No. 367,431

2 Claims. (Cl. 138—61)

This application is a continuation-in-part of my copending application Serial No. 280,137 filed June 20, 1939.

This invention relates to hose couplings.

The present invention, while widely applicable for use with many types of hoses used for many varying purposes, in its present embodiment, is particularly adapted for use as a coupling element for connecting a gasoline delivery hose to a pump or like supply. Hoses used for such purposes frequently deteriorate most rapidly at or near the coupling due to their being bent at a sharp angle from the coupling during manipulation and due also to leakage of gasoline, fuel oil or the like, which may occur at the threaded connection of the coupling and drip down the coupling upon the hose.

The couplings heretofore used have presented relatively sharp edges or portions against which the hose bears when bent sideways with the result that the strains to which the hose is subjected are localized along sharp lines or small areas. The walls of the hose are not so supported as to distribute the strain applied or to prevent collapse thereof. For this reason the fabric or reinforcing means embodied in the hose is frequently ruptured or permanently injured along sharp lines adjacent the end of the coupling. This weakening of the hose coupled with the action of sun and rain on the rubber or fabric covering of the hose, usually brings about a deterioration of the hose at or near the coupling much prior to a like deterioration of other portions of the hose.

It is, therefore, a prime object of the invention to provide a coupling which is designed to protect the hose from such deteriorating influences.

It is a further object to provide a protecting coupling which, while effective and efficient both as a coupling and as a protector, is also novel, simple, durable and designed for inexpensive manufacture.

A more specific object of the invention is to provide a hose coupling having a protecting guard or shield which will act not only to limit the angle at which the hose may be bent and distribute the strain placed upon the hose at the coupling, but which will also act to shed rain, gasoline, oil or other liquid so as to preclude its contacting the hose at or near the coupling or adjacent those portions of the hose which are subjected to the greatest strain during use.

Another object is to provide such a coupling with a guard or shield which will also shade the protected portion of the hose against the sun's rays, which either with or without the presence of gasoline would otherwise further add to the speed of hose deterioration.

A still further object is to provide a device of the type set forth which is so constructed that its protecting portion acts also to materially aid in assembling the hose to the coupling.

Figure 2:
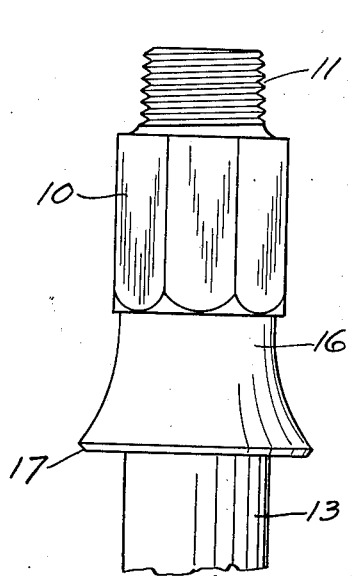
Figure 3:
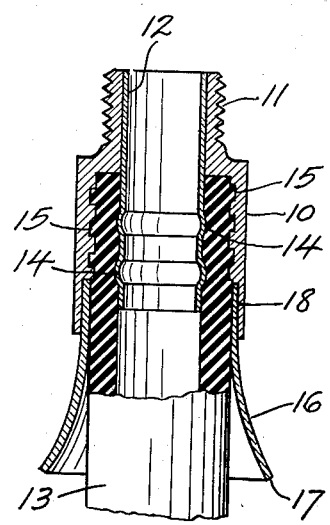

Numerous other objects and features of the invention will be apparent from a consideration of the following specification taken in connection with the accompanying drawing in which:

Figure 1 is a view of the coupling as in use, assembled with a pump and the hose, Figure 2 is a detail side elevation of the coupling with hose attached, and Figure 3 is a vertical sectional view through the coupling and hose.

While the inventive concept hereof is applicable to many varying details of design and construction, it comprises primarily a body having means for connection with a pump, pipe, other hose, or equivalent source of supply and further includes means for attaching the outlet or delivery hose to the body. Extending forward on the delivery end of the body are an inner tubular member which engages the inner surface of the hose, and an outer rigid guard which engages and supports the outer surface of the hose. The portion of the outer guard adjacent the end of the inner tubular member and for a substantial distance beyond the number, is cylindrical in form and serves to prevent flexing of the portion of the hose engaged by the inner tubular member. This prevents injury to the inner surface of the hose due to digging in of the free end of the inner member when the hose is pulled sideways.

The portion of the guard adjacent its extremity and beyond the cylindrical portion thereof is flared outward and presents an inner rounded surface corresponding generally to the curvature of the hose when bent at a safe angle. The hose when pulled sideways is therefore supported over an extended portion of its surface and all sharp lines of contact between the hose and coupling are eliminated. Recurring localized strains to which such hose is usually subjected during use are thereby avoided and the life of the hose greatly increased.

When the hose is at rest the flared portion of the guard also acts as a sun shade and hood to protect the portion of the hose subjected to the greatest strains from the action of the sun, rain, and leakage of gasoline or oil.

From a consideration of the following detailed description of a preferred embodiment of the present invention it will be noted that the arrangement is such that the device faithfully carries out the objects hereinbefore set forth.

Referring specifically to the drawing, the numeral 10 indicates the body of the coupling, the outer surface of which is preferably octagonal, the angularly related surfaces providing means for application of a wrench in applying the coupling to a pump or the like. The pump end of the coupling is provided with an integrally formed externally threaded nipple, which is adapted for threaded connection with the delivery pipe 20 of a pump or equivalent delivery means.

The nipple 11 carries a forwardly extending inner tubular member 12 over which the hose 13 is adapted to be fitted. While the cross sectioning of the hose in Figure 3 indicates, for the purpose of simplicity of illustration only, that the hose is reinforced with fabric, it is, of course, understood that a rubber or rubber and metal hose is contemplated. The inner tubular member 12 is soldered, pressed or otherwise rigidly secured internally of the nipple 11 and after application of the hose is adapted to be spread or deformed as by the annular corrugations 14 to securely lock the inner end of the hose within the body. The inner walls of the body are serrated, corrugated or formed with a spiral 15 which, in cooperation with the corrugations 14 preclude accidental displacement of the hose from the inner tubular member and body.

The outer end of the tubular member terminates slightly short of the outer end of the body proper and the outer end of the body is rabbeted as at 18 to receive the inner cylindrical end of a solid bellmouthed guard 16 which is rigid itself and is rigidly secured as by soldering to the body.

The inner surface of the guard 16 is cylindrical throughout that portion thereof adjacent the end of the inner tubular member 12 and for a sufficient distance beyond the end of the member 12 to prevent the hose from flexing at this point. By supporting the hose at all times in a cylindrical position adjacent the end of the inner tubular member all danger of injury to the inner surface of the hose and rupture of the fabric or digging in of the end of the member 12 when the hose is flexed is eliminated and weakening of the hose at this point is avoided. Furthermore, collapse of the hose is prevented since the walls thereof cannot spread outward at the sides when the hose is bent. Therefore, an unobstructed flow of fluid through the hose is assured even when it is bent at the maximum angle permissable by the coupling.

The extremity of the guard 16 beyond the cylindrical portion thereof is flared outward to the rim 17 and so provides a bell mouth which presents a curved inner surface corresponding generally in shape to the maximum safe bending angle of the type of hose used in gasoline dispensing devices. The curvature will, of course, vary with different hose and different applications of the connector but in practice it has been found that for use with the hose ordinarily employed on dispensing pumps the radius of curvature should be roughly equal to about one and one half times the external diameter of the hose itself. When the radius of curvature is no greater than the outside diameter of the hose the flaring portion of the guard does not extend sufficiently beyond the cylindrical portion to provide the desired support for the hose or prevent such spread of the walls of the hose as would permit collapse thereof on sharp bending. Conversely it is found that if the radius of curvature of the inner surface of the flared portion of the guard is much more than twice the outside diameter of the hose it will not permit sufficient bending of the hose adjacent the coupling and the hose therefore will bear forcibly against the rim 17 when pulled sideways producing sharp localized strains in the material. While these proportions are only approximate and will vary with the nature and diameter of the hose they are generally applicable to that type of hose used on conventional dispensing pumps and of about one and one quarter to one and one half inch outside diameter.

In use it will be seen that the flaring bellmouthed guard will act as a guide in inserting the hose between the confines of the inner tubular member and inner body wall and after the hose is secured in place, the curvature of the inner face of the guard will permit a limited curving of the hose, but will preclude any angular bending and contact between the hose and coupling which tends to break the fabric of the hose and crack or check its rubber or fabric covering; the rigidity of the guard acting positively in its limiting action.

It will also be noted that the internal connection of the inner end of the guard within the body and the solid construction of the guard skirt preclude the dripping upon the attached portion of the hose of any leakage of oil or gasoline which might occur at the joint of the nipple with the supply pipe 20, or in fact, any dripping of water, oil, gasoline or other liquid which will flow down the face of the body and out upon the outer surface of the guard to evaporate off or drip from the spaced rim 17 without coming in contact with the connected end of the hose. The guard similarly protects the connected end of the hose from direct sun rays which otherwise add their effect to the hose deterioration at that point.

In a further consideration of the structure, it will be noted that since the inner end of the guard extends within the body to an extent beyond the outer end of the inner tubular member, the inner end is thus firmly retained in position by the pressure exerted between the inner face of the body and the outer face of the inner tubular member. Thus, although rigid connection, preferable by soldering, is recommended, it will be seen that such may not in all cases be required and that in any case, the relationship of parts is such that danger of fracture of the guard to body union is minimized.

From the foregoing, it will be seen that the invention provides a novel, simple and improved device which will ably perform the objects set forth and it will be understood that numerous changes, modifications and the full use of equivalents may be resorted to in carrying out the invention, without departing from the spirit or scope of the appended claims.

What I claim is:

1. A hose coupling comprising a body formed on one end with means for attaching it to a support and formed on the other end with a recess having generally cylindrical walls and of suitable diameter to receive and fit snugly about a hose, said body being formed with a central bore having a tubular element fixedly secured therein and extending into said recess in position to engage the inner surface of a hose to secure the hose to the coupling, and a stiff guard member having the inner end thereof extending into said recess and rigidly secured to said body and having the outer end thereof extending beyond said body and formed with a bell mouth, the inner surface of said guard member having a generally cylindrical portion constituting in effect a continuation of the inner surface of said recess which extends beyond the end of said inner tubular element for a distance sufficient to prevent substantial displacement of the portion of the hose adjacent the end of said element when the hose is pulled sideways, whereby the area of attachment and the area of flexing of said hose are effectually separated.

2. A hose coupling having a body with means on one end thereof for attaching it to a support, the other end of the body being formed with a recess having generally cylindrical walls adapted to receive and fit snugly about a hose, said body having a central bore with a tubular element rigidly secured therein and extending into said recess in position to engage the inner surface of a hose to secure the hose to the coupling, the portion of said body near the end of said recess being internally rabbeted and receiving the inner cylindrical end of a bell mouthed guard member to support and hold said member rigidly in place, the inner surface of said guard member having a cylindrical portion forming in effect a continuation of the cylindrical walls of said recess and extending beyond the end of said inner tubular element for a distance sufficient to prevent displacement of the portion of the hose adjacent the end of said element when the hose is pulled sideways, whereby the area of attachment and the area of flexing of the hose are effectively separated.

LESTER A. CARLSON.